United States Patent [19]
Ozaki et al.

[11] Patent Number: 5,054,886
[45] Date of Patent: Oct. 8, 1991

[54] LENS FRAME

[75] Inventors: Yukio Ozaki; Hideki Yamamoto, both of Tokyo, Japan

[73] Assignee: Pioneer Electric Corporation, Tokyo, Japan

[21] Appl. No.: 513,274

[22] Filed: Apr. 24, 1990

[30] Foreign Application Priority Data

Sep. 27, 1989 [JP] Japan ............................. 1-112088[U]

[51] Int. Cl.$^5$ .............................................. G02B 7/02
[52] U.S. Cl. .................................. 359/823; 359/827; 359/819
[58] Field of Search ............... 350/245, 247, 248, 252, 350/255, 257, 429, 430, 320

[56] References Cited

U.S. PATENT DOCUMENTS

| | | | |
|---|---|---|---|
| 4,738,512 | 4/1988 | Faatz et al. | 350/245 |
| 4,812,015 | 3/1989 | Iizuka et al. | 350/255 |
| 4,911,542 | 3/1990 | Nishio et al. | 350/255 |
| 4,957,341 | 9/1990 | Hasegawa | 350/252 |

FOREIGN PATENT DOCUMENTS

| | | | |
|---|---|---|---|
| 197804 | 4/1978 | Fed. Rep. of Germany | 350/252 |
| 287933 | 11/1988 | Japan | 350/252 |

Primary Examiner—Bruce Y. Arnold
Assistant Examiner—Thong Nguyen
Attorney, Agent, or Firm—Finnegan, Henderson, Farabow, Garrett, and Dunner

[57] ABSTRACT

A lens frame of the projection lens to be attached, for example, on a projector of a projection-type television comprising a lens barrel for supporting the projection lens, a support member for rotatably supporting the lens barrel so that the lens barrel can be rotated about an optical axis of the projection lens to a prescribed position, and a fixing portion for securing the lens barrel to the support member and for frictionally maintaining the lens barrel in a selected position without displacing the projection lens from the optical axis of the projection lens.

7 Claims, 4 Drawing Sheets

LENS FRAME

BACKGROUND OF THE INVENTION

1. Field of the Invention

The present invention relates to a lens frame of a projection lens to be attached, for example, on a projector of a projection-type television.

2. Description of the Related Art

FIG. 7 shows a projector of a projection television wherein a lens barrel 10, in which a projection lens is incorporated, is supported by a barrel support portion 20 and the barrel support portion 20 is attached to a projection tube 40 through a coupler 30 for performing optical coupling. An image formed on a projection tube 40 is projected on a screen 50 through the projection lens incorporated within the lens barrel 10.

FIG. 5 shows an example of a conventional lens barrel and barrel support portion wherein a cylindrical lens barrel 10 is fitted into a cylindrical portion 20a of a barrel support portion 20, and a fixing portion 60 is attached to lens barrel 10 through a slot portion 20b slantedly formed through a cylindrical portion 20a.

As shown in FIG. 6, a fixing portion 60 is structured such that a screw 60a is fitted into a protrusion 10a through a wing nut 60b, a washer 60c, and a collar 60d. The protrusion 10a is formed on the side surface of the lens barrel 10 and a collar 60d is fitted in the slot portion 20b of the cylindrical portion 20a.

To focus the image formed on the projection tube 40 onto the screen 50, the lens barrel 10 is rotated within the barrel support portion 20 to cause the collar 60d to slide along the slot portion 20b so that the lens barrel 10 is rotatably displaced relative to the barrel support portion 20 with respect to the central axis of the cylindrical portion 20a.

Upon completion of the focusing of the image on the screen 50, the wing nut 60b is turned and tightened to force the lens barrel 10 against the cylindrical portion 20a of the barrel support portion 20 so as to fix the lens barrel 10 to the barrel support portion 20.

In the foregoing conventional configuration, however, there has been a problem in that the number of parts comprising the fixing portion 60 is so large that it takes along time to assemble the lens barrel 10 and the barrel support portion 20 because it is necessary to pass the screw 60a through the wing nut 60b, the washer 60c, and the collar 60d while, at the same time, to position the protrusion 10a of the lens barrel 10 so as to be coincident with the slot portion 20b of the cylindrical portion 20a so that the screw 60a can be properly fitted into the protrusion 10a of the lens barrel 10.

Further, even though the center of the lens barrel 10 coincides with that of the cylindrical portion 20a before fixing by the wing nut 60b as shown in FIG. 4(a), the central axis of the lens barrel 10 becomes displaced from that of the cylindrical portion 20a when fixing is performed by tightening the wing nut 60b because the portion of the lens barrel 10 adjacent to the fixing portion 60 is pulled toward the inner surface of the cylindrical portion 20a as shown in FIG. 4(b). This results in another problem in that, upon fixing the wing nut 60b, the central axis of the barrel support portion 20, which is fixed at a position optically set with respect to the coupler 30, is displaced from the central axis of the lens barrel 10, and consequently displaced from the optical axis of the projection lens incorporated within the lens barrel 10, so that the image forming performance of the projector deteriorates.

SUMMARY OF THE INVENTION

It is therefore an object of the present invention to solve the foregoing problems in the prior art.

It is another object of the present invention to provide a lens frame for use, for example, in a projector of a projection television, wherein the number of parts comprising the lens frame can be decreased to simplify the assembly of the projector, and wherein the lens barrel of the projector can be fixed without displacing the optical axis of the lens.

These and other objects are attained by a lens frame comprising a lens barrel for supporting a lens, the lens having an optical axis, a lens barrel support means for supporting the lens barrel, the lens barrel being rotatable about the optical axis of the lens to a selected rotational position, and fixing means for securing the lens barrel to the lens barrel support means and for frictionally maintaining the lens barrel in the selected rotational position without displacement of the lens barrel with respect to the optical axis of the lens. The lens barrel may be rotationally position in another selected position when rotated with a force exceeding a predetermined rotational force.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENT

According to the present invention, in a lens frame wherein a guide protrusion of a cylindrical lens barrel is engaged with a guide slot of a support member so that focusing of an image is performed by rotating the cylindrical lens barrel in the axial direction of the support member, a slidable-contact surface parallel to the guide slot is formed on the support member and a protrusion is in slidable-contact surface where the guide protrusion is engaged with the guide slot formed on the lens barrel. The lens barrel is secured by the support member through contact friction between the guide slot and the guide protrusion and contact friction between the slidable-contact surface and the protrusion forced against the slidable-contact surface.

Figure 1:
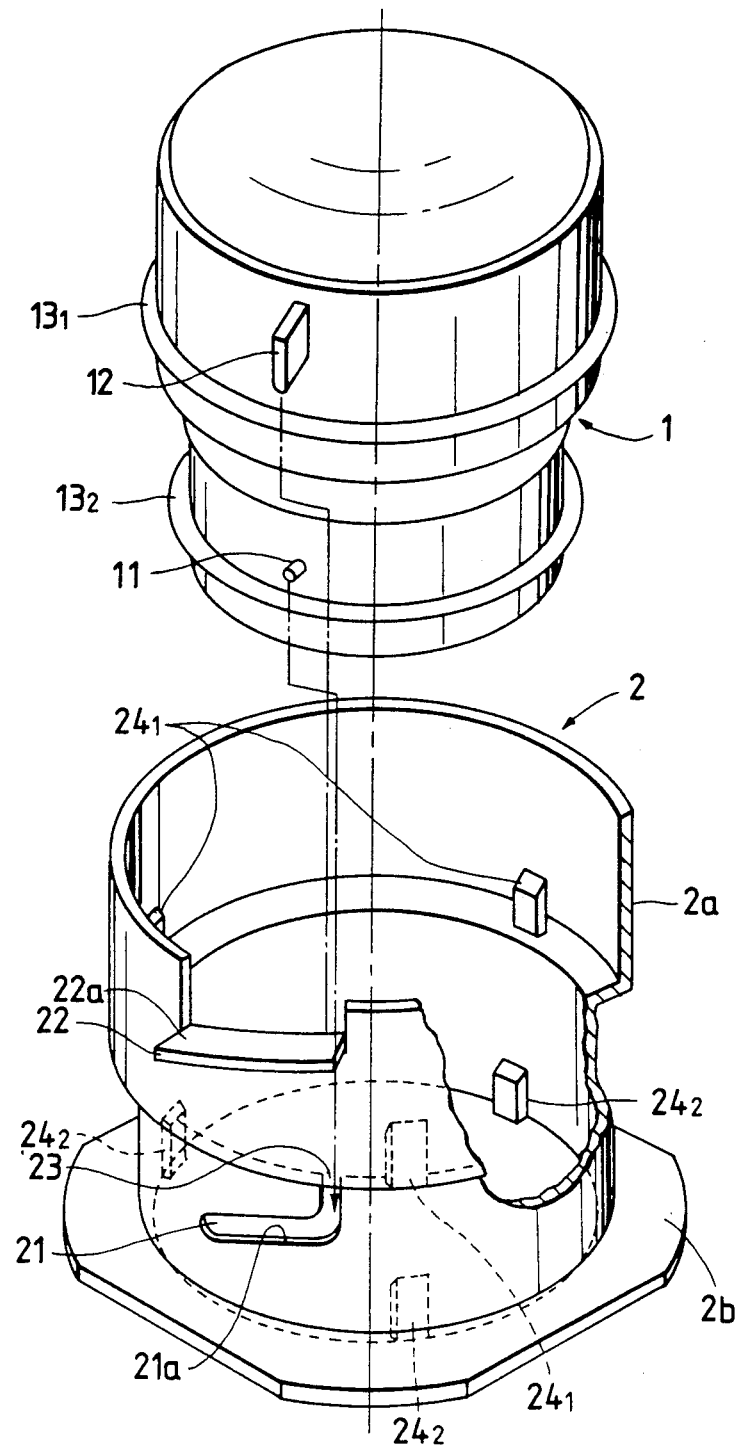
FIG. 1 illustrates an exploded view of an embodiment of the lens frame according to the present invention.
Figure 2:
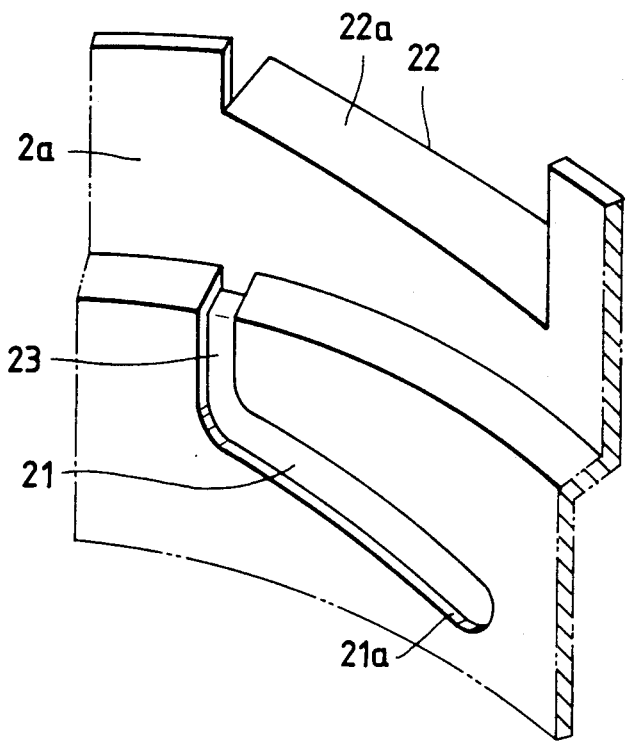
FIG. 2 illustrates an enlarged view of a portion of the lens frame of FIG. 1.

As shown in FIG. 1, the lens frame of the present invention comprises a lens barrel 1, in which a lens is incorporated, and a barrel support portion 2 having a cylindrical portion 2a and a flange 2b. The outer diameter of the lens barrel 1 at the screen side, i.e., the side farthest from the flange 2b, is larger than the outer diameter at the projection tube side, i.e., the side closest to the flange 2b. Accordingly, the inner diameter of the cylindrical portion 2a at the screen side is larger than the inner diameter at the projection tube side in accordance with the shape of the lens barrel 1. The barrel support portion 2 and lens barrel 1 are formed of, for example, a synthetic resin.

The lens barrel 1 comprises a guide protrusion 11, a boss 12 having a convex curved surface facing the projection tube side of the lens barrel 1, and ring-like collar protrusion $13_1$ and $13_2$ formed along a periphery of the lens barrel 1. The guide protrusion 11 and the boss 12 are formed on the lens barrel 1 so as to be vertically aligned in the axial direction of the lens barrel 1.

The barrel support portion 2 comprises a guide slot 21 having a guide surface 21a, and being slantedly formed in the side of the cylindrical portion 2a, a rib 22 having a slidable-contact surface 22a parallel to the guide slot 21, a notch portion 23 formed in the guide slot 21 at its one end, and protrusions $24_1$ and $24_2$ formed on an inner surface of the cylindrical portion 2a so as to extend vertically in the axial direction of the cylindrical portion 2a.

Figure 3A:
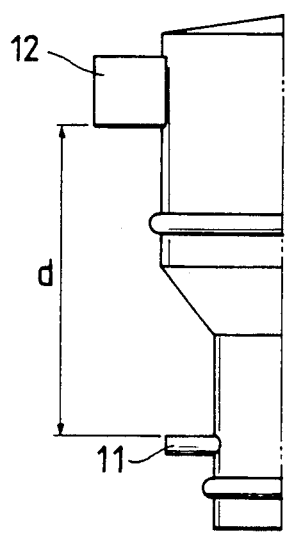
FIG. 3 illustrates the relationship between the distance between the guide protrusion and the boss as well as the distance between the guide surface and the slidable-contact surface of the lens frame of FIG. 1.
Figure 3B:
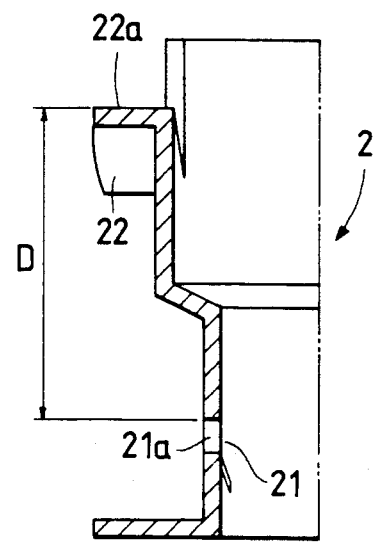
Figure 4A:
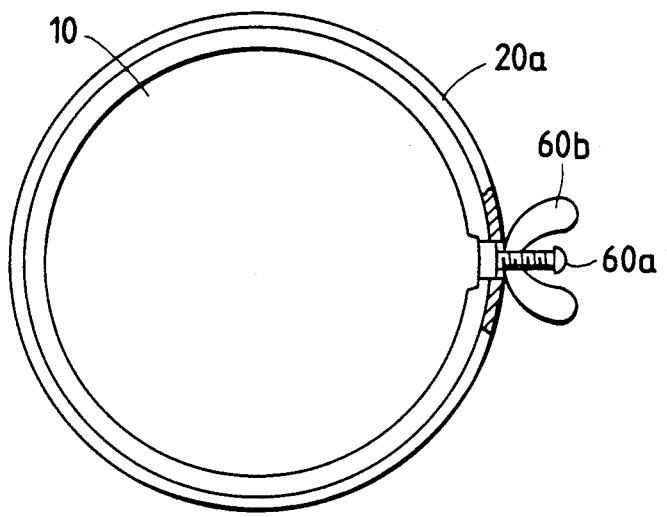
FIGS. 4(a) and 4(b) illustrate the problems associated with the prior art.
Figure 4B:
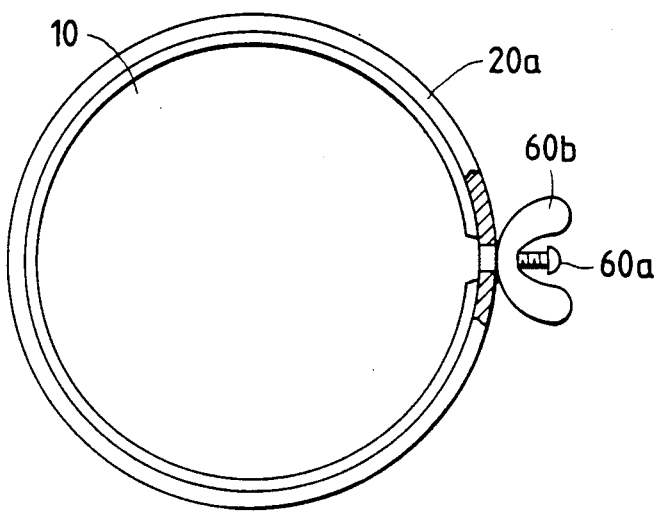
Figure 5:
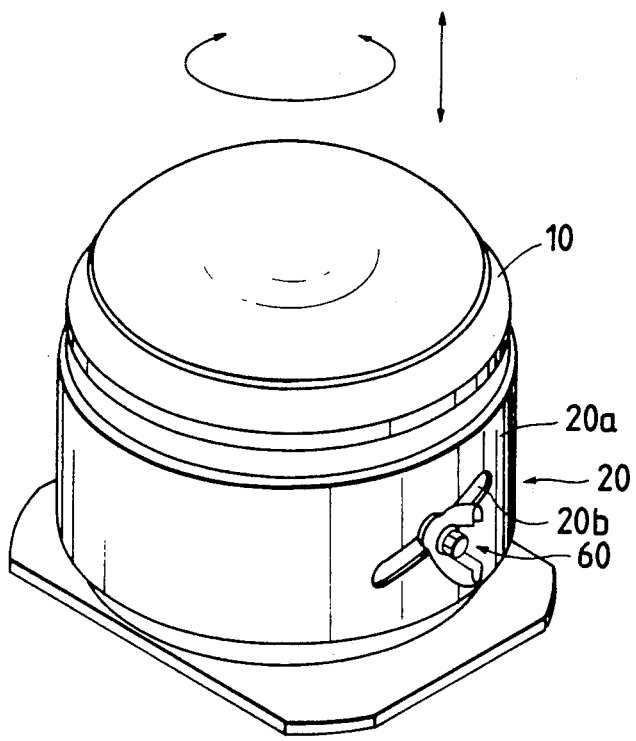
FIG. 5 illustrates an example of a conventional lens frame.
Figure 6:
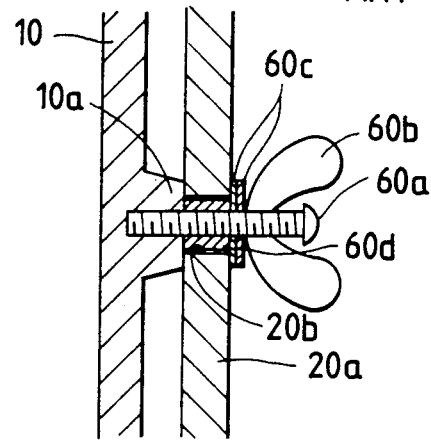
FIG. 6 illustrates the fixing portion of the conventional lens frame of FIG. 5.
Figure 7:
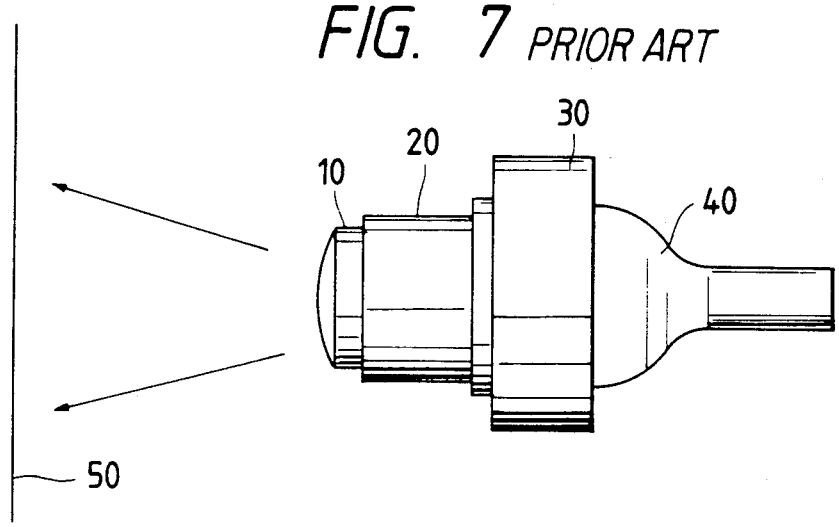
FIG. 7 illustrates the conventional projector of a projection television.

As shown in FIGS. 3(a) and 3(b), a distance d (FIG. 3(a)) between the upper surface of the guide protrusion 11 and the corner curved surface of the boss 12 in the lens barrel 1 is slightly smaller than a distance D (FIG. 3(b)) between the end 21a of the guide slot 21 and the slidable-contact surface 22a of the rib 22 in barrel support portion 2.

The inner diameter of the cylindrical portion 2a at the protrusions $24_1$ is formed to be slightly smaller than the outer diameter of the lens barrel 1 at the collar protrusion $13_1$, and the inner diameter of the cylindrical portion 2a at protrusions $24_2$ is formed to be slightly smaller than the outer diameter of the lens barrel 1 at the collar protrusion $13_2$.

When the lens barrel 1 is inserted into the barrel support portion 2, the guide protrusion 11 is positioned at the notch portion 23 of the cylindrical portion 2a and the lens barrel 1 is pressed into the cylindrical portion 2a so that the collar portions $13_1$ and $13_2$ are forced against the protrusions $24_1$ and $24_2$, respectively, and so that the guide protrusion 11 is positioned in the guide slot 21 and the convex curved surface of the boss 12 abuts on the slidable-contact surface 22a of the rib 22. The lens barrel 1 is slightly rotated so that the guide projection 11 slides along the guide slot 21.

Once the guide protrusion 11 has been engaged with the guide slot 21 as described above, the guide protrusion 11 is forced against the guide surface 21a of the guide slot 21 and the convex curved surface of the boss 12 is forced against the slidable-contact surface 22a of the rib 22 so that the lens barrel 1 is securely fixed to the barrel support portion 2 at a desired rotational position within a range defined by the amount by which the guide protrusion 11 can be displaced in the guide slot 21.

Further, it is possible to perform focusing in accordance with the rotational position of the lens barrel 1 relative to the cylindrical portion 2a.

Although relatively small frictional forces are generated between the collar portions $13_1$ and $13_2$ and the protrusions $24_1$ and $24_2$, respectively, to secure the lens barrel 1 to the barrel support portion 2, frictional forces are also generated between the boss 12 and the slidable contact surface 22a and between the guide protrusion 11 and the guide surface 21 to improve the accuracy of the present invention by ensuring that the optical axis of the barrel support portion 2 coincides with the optical axis of the lens barrel 1 while further securing the lens barrel 1 to the barrel support portion 2.

As described above, according to the present invention, in a lens frame wherein a cylindrical lens barrel is fittingly inserted into a cylindrical support member and a guide protrusion of the lens barrel is engaged with a guide slot of the support member so that the lens barrel slides in the axial direction of the support member by the rotation of the lens barrel, a slidable-contact surface parallel to the guide slot is formed on the support member and an abutment protrusion to be forced against the slidable-contact surface in the state of engagement between the guide protrusion and the guide slot is formed on the lens barrel so that the lens barrel is held by the support member through the contact friction between the guide protrusion and the guide slot and the contact friction between the abutment protrusion and the slidable-contact surface. Therefore, in a lens frame of a projector for use, for example, in a projection television the number of parts comprising the lens frame is decreased to simplify the assembly process of the projector, and the lens barrel can be supported in a manner such that displacement of the optical axis of the lens barrel and the support member is substantially eliminated.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A lens frame comprising:
    a lens barrel means for supporting a lens, said lens having an optical axis;
    lens barrel support means for supporting said lens barrel means, said lens barrel means being rotatable about said optical axis of said lens to a selected rotational position; and
    fixing means for securing said lens barrel means to said lens barrel support means and for frictionally maintaining said lens barrel means in said selected rotational position without displacement of said lens barrel means with respect to the optical axis of said lens, wherein said fixing means comprises:
    a guide slot formed in said lens barrel support means;
    a guide protrusion formed on said lens barrel means, said guide protrusion being slidably engaged with said guide slot to create a contact friction therebetween;
    a rib having a slidable-contact surface formed on said lens barrel support means; and
    an abutment protrusion formed on said lens barrel means, said abutment protrusion slidably abutting on said slidable-contact surface to create a contact friction therebetween.

2. The lens frame according to claim 1, wherein said lens barrel means and said lens barrel support means are cylindrical in form.

3. The lens frame according to claim 2, wherein said lens is at least partially contained with in said lens barrel means, and wherein said lens barrel means is at least partially contained within said lens barrel support means.

4. The lens frame according to claim 1, wherein said guide protrusion and said abutment protrusion are vertically aligned on said lens barrel means with respect to said optical axis of said lens and are separated by a prescribed distance and wherein said guide slot and said slideable contact surface are vertically aligned on said lens barrel support means with respect to said optical axis of said lens and are separated by a prescribed distance.

5. The lens frame according to claim 4, wherein said prescribed distance between said guide protrusion and said abutment protrusion is less than said prescribed distance between said guide slot and said slidable contact surface.

6. The lens frame according to claim 1, wherein said guide slot is slantedly formed in said lens barrel support means and said slidable contact surface is slantedly formed on said lens barrel support means with respect to said optical axis of said lens, wherein said guide slot and said slidable-contact surface are parallel.

7. The lens frame according to claim 1, wherein said fixing means further comprises a plurality of protrusions formed on an inside surface of said lens barrel support means and a plurality of corresponding protrusions formed on the periphery of said lens barrel means to create contact friction therebetween.

* * * * *